United States Patent
Hafvenstein et al.

(10) Patent No.: US 10,912,252 B2
(45) Date of Patent: Feb. 9, 2021

(54) LOCALIZED HYDRAULIC CIRCUIT CONFIGURATION DETECTION AND LOADING IN A SELF-PROPELLED AGRICULTURAL PRODUCT APPLICATOR

(71) Applicant: CNH Industrial America LLC, New Holland, PA (US)

(72) Inventors: David J. Hafvenstein, Benson, MN (US); Jeffrey S. Martin, Benson, MN (US); Jason Matthew Schwiderski, Benson, MN (US); James Beaucaire, Wheaton, IL (US)

(73) Assignee: CNH Industrial America LLC, New Holland, PA (US)

( * ) Notice: Subject to any disclaimer, the term of this patent is extended or adjusted under 35 U.S.C. 154(b) by 276 days.

(21) Appl. No.: 15/855,059

(22) Filed: Dec. 27, 2017

(65) Prior Publication Data
US 2019/0191622 A1    Jun. 27, 2019

(51) Int. Cl.
| | | |
|---|---|---|
| *A01C 23/00* | (2006.01) | |
| *B05B 13/00* | (2006.01) | |
| *A01C 23/04* | (2006.01) | |
| *B05B 15/65* | (2018.01) | |
| *A01B 71/06* | (2006.01) | |
| *F16L 37/56* | (2006.01) | |
| *A01M 7/00* | (2006.01) | |
| *A01B 51/02* | (2006.01) | |

(52) U.S. Cl.
CPC ............ *A01C 23/007* (2013.01); *A01B 71/06* (2013.01); *A01C 23/047* (2013.01); *A01M 7/0082* (2013.01); *B05B 13/005* (2013.01); *B05B 15/65* (2018.02); *F16L 37/56* (2013.01); *A01B 51/026* (2013.01)

(58) Field of Classification Search
CPC .......... F15B 2211/327; F15B 2211/328; F15B 2211/426; F15B 2211/526; F15B 2211/3059; F15B 2211/30565; F15B 2211/31505; F15B 2211/31517; F15B 2211/31547
See application file for complete search history.

(56) References Cited

U.S. PATENT DOCUMENTS

| | | |
|---|---|---|
| 4,867,474 A | 9/1989 | Smith |
| 5,074,373 A | 12/1991 | Schmidt |
| 6,151,874 A | 11/2000 | Eis |

(Continued)

*Primary Examiner* — Hau V Phan
(74) *Attorney, Agent, or Firm* — Rebecca L. Henkel; Rickard K. DeMille (57) ABSTRACT

A localized hydraulic circuit configuration detection and loading arrangement, and method, utilize a pattern of pins in an electrical interface connector that is unique to a particular hydraulically powered product delivery unit mounted on a self-propelled agricultural product applicator to close or leave open electrical circuits in solenoid operated pump control valve arrangements for selectively connecting a flow of hydraulic fluid at an operating pressure from one or more continuously operating pumps of the applicator to the product delivery unit, or for selectively bypassing the flow of fluid from one or more of the pumps back to a hydraulic reservoir of the applicator at a low, bypass pressure. When no product delivery unit is mounted on the applicator, the flows from all of the pumps are bypassed to the reservoir at the low, bypass pressure.

17 Claims, 7 Drawing Sheets

(56) References Cited

U.S. PATENT DOCUMENTS

| | | |
|---|---|---|
| 7,478,530 B2 | 1/2009 | Ueda |
| 8,464,526 B2 | 6/2013 | Renner |
| 9,181,965 B2 | 11/2015 | Pirotais |
| 9,198,343 B2 | 12/2015 | Mariman et al. |
| 2014/0311138 A1 | 10/2014 | Renner |
| 2015/0366124 A1 | 12/2015 | Kremmer et al. |
| 2016/0318393 A1 | 11/2016 | Treinen |
| 2019/0195246 A1* | 6/2019 | Jamison .............. F15B 13/0814 |

* cited by examiner

LOCALIZED HYDRAULIC CIRCUIT CONFIGURATION DETECTION AND LOADING IN A SELF-PROPELLED AGRICULTURAL PRODUCT APPLICATOR

FIELD OF THE INVENTION

This invention generally relates to self-propelled agricultural product applicators, and more particularly to hydraulic and electrical interfaces between a self-propelled agricultural product applicator and an agricultural product delivery unit, such as a sprayer or dry product spreader, mounted on a bed of the applicator.

BACKGROUND OF THE INVENTION

Modern agricultural practices rely heavily on timely application of agricultural products such as fertilizers and chemicals using product delivery units mounted on a self-propelled agricultural product applicator. Some of these products are applied in dry form using a product delivery unit in the form of dry product spreading equipment, and others are applied in liquid form using product delivery units in the form of sprayers.

Self-propelled agricultural product applicators are typically complex and expensive machines. It is advantageous, therefore, to mount the dry and liquid product application equipment on the same product applicator to obviate the need for having one applicator carrying a product delivery unit configured for applying only dry products, and another applicator carrying a product delivery unit configured for applying only liquid products. Modern agricultural practices also sometimes call for applying two or more different agricultural products at the same time, in carefully metered proportions. Different product delivery units are typically more effective and efficient for use in applying multiple products in the same pass. Having an expensive applicator set up to carry only a single product delivery unit for each anticipated single or multiple, dry or liquid application possibility would be prohibitively expensive.

For efficient and effective use of a single self-propelled agricultural applicator with several different configurations of agricultural product delivery units, it is desirable that provisions be made for quickly changing the product delivery units mounted on the applicator from one to another. Attaching components of each individual product delivery unit to a skid having a common mechanical mounting arrangement cooperatively configured for attachment to a bed of the same applicator provides significant advantages, in this regard, in comparison to mounting the individual components of a given product delivery unit directly to the bed of the applicator.

Typically, interchangeable product delivery units, and the self-propelled applicators designed to carry them are designed so that sources of hydraulic and electrical power and control are located, to the extent possible and practical in the self-propelled applicator, and are connected by hydraulic and electrical interfaces to the product delivery units mounted on the applicator. Different product delivery units may, and often do have significantly different needs for hydraulic power. For example, a dry product delivery unit configured to simultaneously apply multiple different dry products may require a larger flow of hydraulic fluid than a dry or liquid product delivery unit configured to apply only a single agricultural product.

For efficient power utilization, and to avoid undesirable heating of the hydraulic fluid during operation of the self-propelled applicator with product delivery units that require smaller flows of hydraulic fluid, multiple continuously running pumps of the applicator are sometimes utilized for providing hydraulic power to the various product delivery units mounted on the applicator. The various pumps are selectively connected in a loaded condition to provide a flow of fluid to the product delivery unit at an operating pressure, or are selectively disconnected from the product delivery unit in a manner that causes the flow from one or more of the pumps to operate in a bypass condition, at a low, bypass pressure to preclude inefficient power consumption and undesirable heating of the fluid.

Having to manually reconfigure the hydraulic and electrical interface connections between the applicator and the product delivery unit for each different product delivery unit carried by the applicator, in the manner required in some prior approaches, is highly undesirable. Such an approach results in much time and money being undesirably consumed each time the applicator is converted from operation with one product delivery unit to another. Such an approach also involves an undesirable risk of error in completing the changeover, and requires a relatively high level of technical skill and knowledge from the person or persons performing the changeover.

It is desirable, therefore, to provide an improved arrangement and method for operating a self-propelled agricultural applicator with two or more product delivery units having differing hydraulic power requirements. It is also desirable to provide an improved arrangement for completing hydraulic and electrical interface connections between a self-propelled agricultural product applicator and various configurations of product delivery units carried by the applicator, particularly in a manner that facilitates and expedites changeover between different product delivery units, and also in a manner that reduces the risk of error and the need for a high level of technical skill and knowledge required to successfully accomplish the changeover.

SUMMARY OF THE INVENTION

The invention provides an improved hydraulic and electrical interface between a self-propelled agricultural product applicator and a hydraulically powered product delivery unit mounted on a bed of the self-propelled agricultural product applicator, through use of a localized hydraulic circuit configuration detection and loading arrangement or method.

A localized hydraulic circuit configuration detection and loading arrangement or method, according to the invention, utilizes a pattern of pins in an electrical interface connector that is unique to a particular hydraulically powered product delivery unit mounted on a self-propelled agricultural product applicator to close or leave open electrical circuits in solenoid operated pump control valve arrangements for selectively connecting a flow of hydraulic fluid at an operating pressure from one or more continuously operating pumps of the applicator to the product delivery unit, or for selectively bypassing the flow of fluid from one or more of the pumps back to a hydraulic reservoir of the applicator at a low, bypass pressure. When no product delivery unit is mounted on the applicator, the flows from all of the pumps may be bypassed to the reservoir at the low, bypass pressure.

In one form of the invention, a localized hydraulic circuit configuration detection and loading arrangement is provided for use in a self-propelled agricultural product applicator having a frame defining a bed for receiving a hydraulically powered product delivery unit. The applicator includes a hydraulic circuit having a reservoir and one or more continuously running hydraulic pumps operatively attached to the frame for delivering a flow of pressurized hydraulic fluid at an operating pressure from the reservoir to a product delivery unit mounted on the bed of the applicator. The applicator and product delivery units each also have respective electrical circuits adapted for connection in electrical communication with one another.

The localized hydraulic circuit configuration detection and loading arrangement may include a quick-coupler manifold arrangement having a valve block adapted for fixed attachment to the frame of the applicator adjacent the bed, and an electrical interface arrangement for connecting the electrical circuit of a product delivery unit mounted on the bed in electrical communication with the electrical circuit of the applicator.

The valve block may include one or more solenoid operated pump control valve arrangements configured and operatively connected for selectively directing a flow of hydraulic fluid at an operating pressure from one or more of the continuously operating pumps of the applicator to the product delivery unit. The solenoid operated pump control valve arrangements are also configured for selectively bypassing the flow of fluid from one or more of the pumps back to the hydraulic reservoir of the applicator at a low, bypass pressure.

The solenoid operated pump control arrangements may also each include a dedicated solenoid activation circuit connected in an open circuit relationship to pins of an applicator electrical connector of the electrical interface arrangement that is mounted on the valve body.

The electrical interface arrangement may further include an electrical interface connector of the product delivery unit that has a pattern of pins unique to a particular hydraulically powered product delivery unit mounted on the self-propelled agricultural product applicator. The unique pattern of pins may be configured and interconnected to close one or more of the dedicated solenoid activation circuits in the solenoid operated pump control valve arrangements for selectively connecting a flow of hydraulic fluid at an operating pressure from one or more of the continuously operating pumps of the applicator to the product delivery unit, in a manner unique to the particular product delivery unit mounted on the bed of the applicator.

In some forms of a localized hydraulic circuit configuration detection and loading arrangement, according to the invention, the solenoid operated pump control valve arrangements may be configured and connected in such a manner that the flow of fluid from all of the pumps is bypassed back to a hydraulic reservoir of the applicator at the low, bypass pressure when no product delivery unit is mounted on the bed of the applicator. The solenoid operated pump control valve arrangements may be further configured and connected in such a manner that the flow of fluid from all of the pumps is bypassed back to a hydraulic reservoir of the applicator at the low, bypass pressure when a product delivery unit is mounted on the bed of the applicator, but the electrical interface connector of the product delivery unit is not connected to the applicator.

In some forms of the invention, the unique pattern of pins in the electrical interface connector of the product delivery unit may be further configured and interconnected to leave open one or more of the dedicated solenoid activation circuits in the solenoid operated pump control valve arrangements for selectively bypassing the flow of fluid from one or more of the pumps back to a hydraulic reservoir of the applicator at the low, bypass pressure in a manner unique to the particular product delivery unit mounted on the bed of the applicator.

Where an applicator includes at least two continuously running pumps and the bed of the applicator is configured to receive at least a first and a second product delivery unit, a localized hydraulic circuit configuration detection and loading arrangement according to the invention may be configured such that the first product delivery unit receives flow from only one of the at least two continuously running pumps, and the second product delivery unit receives flow from more than one of the at least two continuously running pumps. Where the bed of the applicator is further configured to receive at least one additional product delivery unit, a localized hydraulic circuit configuration detection and loading arrangement according to the invention may be further configured for receiving flow from an additional unique combination of the at least two continuously running pumps that is different from the unique combinations of the at least two continuously running pumps supplying flow to the first and second product delivery units.

In some forms of a localized hydraulic circuit configuration detection and loading arrangement according to the invention, the valve block may include an individual inlet passage configured for receiving a flow of pressurized fluid from each pump, with each individual inlet passage being connected in fluid communication with an individual outlet hydraulic interface connection for that pump that is adapted for connection in fluid communication with a product delivery unit mounted on the bed. The valve block may also define a return passage for each pump that is adapted for connection in fluid communication with the reservoir.

The valve block may further include a solenoid operated pump control valve arrangement connected in fluid communication between the individual inlet passage and the return line for that pump, with the solenoid operated pump control valve arrangement for each pump having a solenoid operated bypass valve arrangement for that pump connected in fluid communication between the individual inlet passage and the return line for that pump. The solenoid operated bypass valve arrangement may be configured in such a manner that when the solenoid of the solenoid operated bypass valve arrangement for a particular pump is not energized, the flow from that particular pump passes through that bypass valve arrangement from the inlet to the return line for that particular pump at the low, bypass pressure across the solenoid operated bypass valve. The solenoid operated bypass valve may be further configured in such a manner that when the solenoid of the solenoid operated bypass valve arrangement for a particular pump is energized, bypass flow through the solenoid operated bypass valve arrangement for that particular pump is blocked so that flow from that particular pump is directed to the product delivery unit through the pump inlet passage for that particular pump at the operating pressure of that pump.

In some forms of a localized hydraulic circuit configuration detection and loading arrangement, according to the invention, at least one of the solenoid operated bypass valve arrangements may include a normally-closed, high-flow, low differential pressure relief valve, a control loop having a flow restricting orifice, and a two-way, normally-open, solenoid operated shut off valve.

The normally-closed, high-flow, low differential pressure relief valve may be connected in fluid communication between the pump inlet passage and the return line for one of the pumps. The control loop having the flow restricting orifice may be connected across the normally-closed, low differential pressure relief valve in a parallel circuit arrangement, and the two-way, normally-open, solenoid operated shut off valve may be connected in a series relationship in the control loop between the flow restricting orifice and the return line for the one of the pumps, for controlling flow through the control loop.

The normally-closed, high-flow, low differential pressure relief valve may also have a high-pressure control port connected in fluid communication with the pump inlet passage and a low-pressure control port connected in fluid communication with the control loop between the flow restricting orifice and the two-way, normally-open, solenoid operated shut off valve.

The solenoid of the two-way, normally-open, solenoid operated shut off valve may be configured and connected to the applicator electrical interface connector in such a manner that when the solenoid is not energized the shutoff valve allows a control flow through the control loop generating a pressure drop through the flow restricting orifice sufficient to cause the normally-closed, high-flow, low differential pressure relief valve to open and bypass flow from the inlet passage of the one of the pumps to the return line for that one of the pumps at the low, bypass pressure. The solenoid of the two-way, normally-open, solenoid operated shut off valve may be further configured and connected to the applicator electrical interface connector in such a manner that when the solenoid is energized the normally-open shut off valve blocks the control flow through the control loop, thereby resulting in no pressure drop being generated through the flow restricting orifice and causing the normally-closed, high-flow, low differential pressure relief valve to close and block bypass flow from the inlet passage of the one of the pumps to the return line for that one of the pumps, in such a manner that the inlet passage for that one of the pumps delivers flow at the operating pressure of that one of the pumps to the product delivery unit.

A solenoid operated bypass valve arrangement, according to the invention, may yet further include a high pressure relief valve connected in parallel with a two-way, normally-open, solenoid operated shut off valve downstream from the flow restricting orifice, and configured to open at a predetermined maximum operating pressure above the operating pressure, in such a manner that when the high pressure relief valve opens, flow through the high pressure relief valve allows a control flow through the control loop generating a pressure drop through the flow restricting orifice sufficient to cause the normally-closed, high-flow, low differential pressure relief valve to open and bypass flow in parallel with the high pressure relief valve from the inlet passage of the one of the pumps to the return line for that one of the pumps at the predetermined maximum operating pressure.

The invention may also take the form of a self-propelled agricultural applicator including a localized hydraulic circuit configuration detection and loading arrangement, according to the invention.

The invention may further take the form of a method for localized hydraulic circuit configuration detection and loading of one or more continuously operating pumps of a self-propelled agricultural product applicator for supplying a flow of hydraulic fluid to a hydraulically powered product delivery unit mounted on a bed of a main frame of the applicator, where the applicator includes a hydraulic circuit having a reservoir and one or more continuously running hydraulic pumps for delivering a flow of pressurized hydraulic fluid at an operating pressure from the reservoir to a product delivery unit mounted on the bed of the applicator, and the applicator and product delivery unit each also have respective electrical circuits adapted for connection in electrical communication with one another.

Such a method may include providing an electrical interface connector having a pattern of pins in an electrical interface connector that is unique to the particular hydraulically powered product delivery unit mounted on the applicator, and also providing in the applicator an individual solenoid operated pump control valve arrangement and an associated electrical circuit for each of the continuously running pumps of the applicator. Such a method may further include utilizing the pattern of pins in the electrical interface connector that is unique to the particular hydraulically powered product delivery unit mounted on the applicator to selectively close one or more of the electrical circuits in solenoid operated pump control valve arrangements of the applicator, for connecting a flow of hydraulic fluid at an operating pressure from one or more of the continuously operating pumps of the applicator to the product delivery unit.

A method for localized hydraulic circuit configuration detection and loading, according to the invention, may further include utilizing the pattern of pins in the electrical interface connector that is unique to the particular hydraulically powered product delivery unit mounted on the applicator to leave open one or more of the electrical circuits in solenoid operated pump control valve arrangements of the applicator, for selectively bypassing the flow of fluid from one or more of the pumps back to the hydraulic reservoir of the applicator at a low, bypass pressure.

Some forms of a method for localized hydraulic circuit configuration detection and loading, according to the invention, may include leaving open all of the electrical circuits in solenoid operated pump control valve arrangements of the applicator, for selectively bypassing the flow of fluid from all of the pumps back to the hydraulic reservoir of the applicator at a low, bypass pressure, when no product delivery unit is mounted on the applicator.

Other aspects, objects and advantages of the invention will be apparent from the following detailed description and accompanying drawings of exemplary embodiments of the invention.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
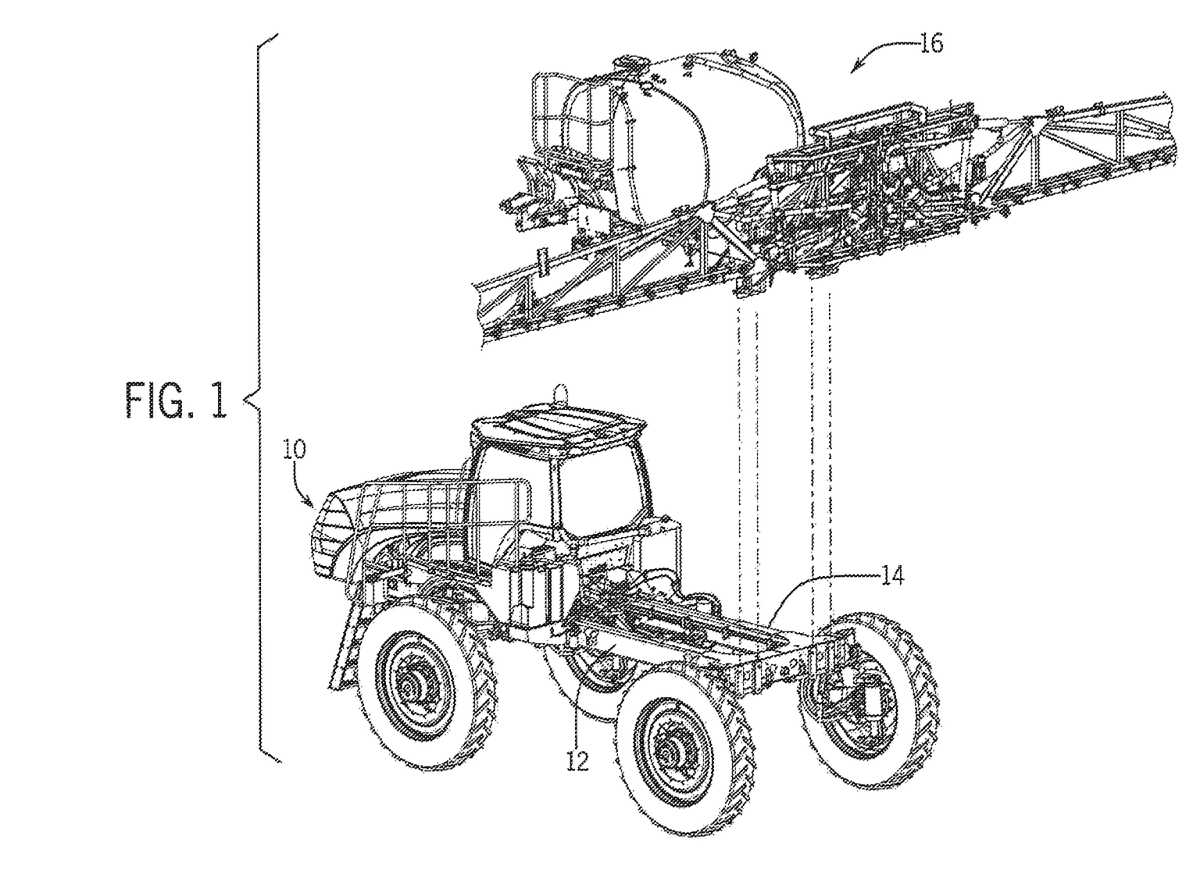
FIG. 1 is an exploded isometric illustration of an exemplary embodiment of a self-propelled agricultural product applicator, and a product delivery unit in the form of a sprayer configured for mounting on a bed of the applicator.
Figure 2:
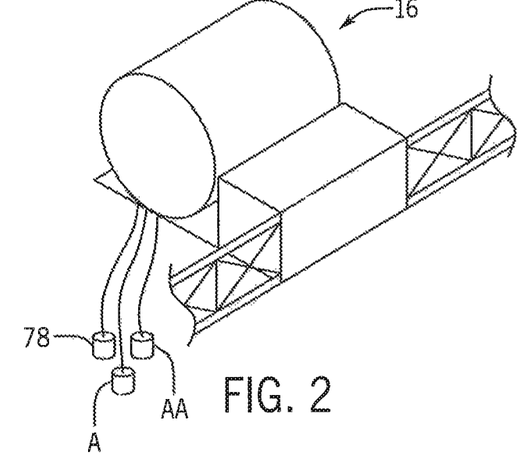
FIGS. 2-6 are isometric illustrations of several different liquid and dry agricultural product delivery units configured for mounting on the applicator of FIG. 1.
Figure 3:
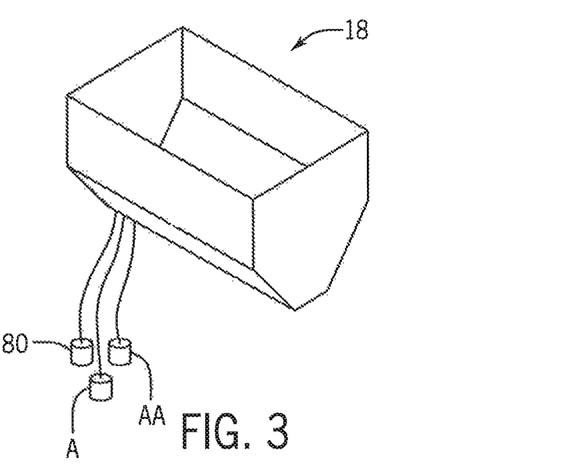
Figure 4:
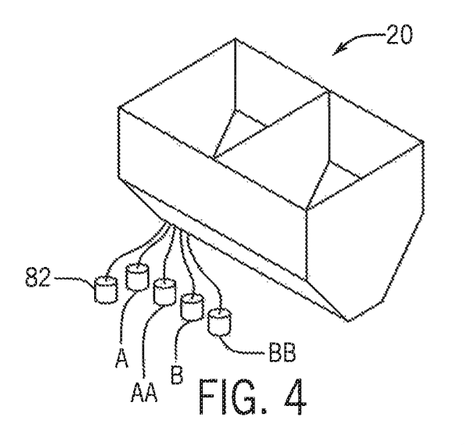
Figure 5:
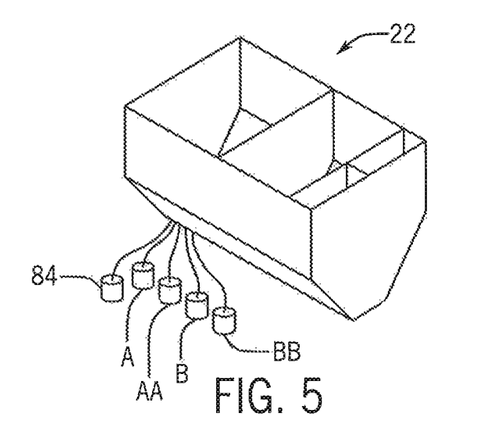
Figure 6:
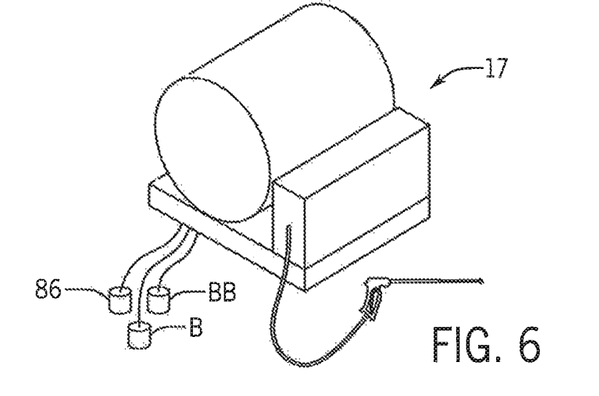

FIG. 1 shows an exemplary embodiment of a self-propelled agricultural product applicator 10 having a frame 12 defining a bed 14 for receiving a hydraulically powered product delivery unit, such as the sprayer 16 shown positioned above the bed 14 in FIG. 1. The exemplary embodiment of the applicator 10 is configured for operation with any of several product delivery unit configurations including the sprayer 16 shown in FIGS. 1 and 2, a single-bin dry box spreader shown in FIG. 3, a two-bin dry box spreader shown in FIG. 4, a four-bin dry box spreader shown in FIG. 5, or a low-volume hand sprayer 17 as shown in FIG. 6.

Figure 7:
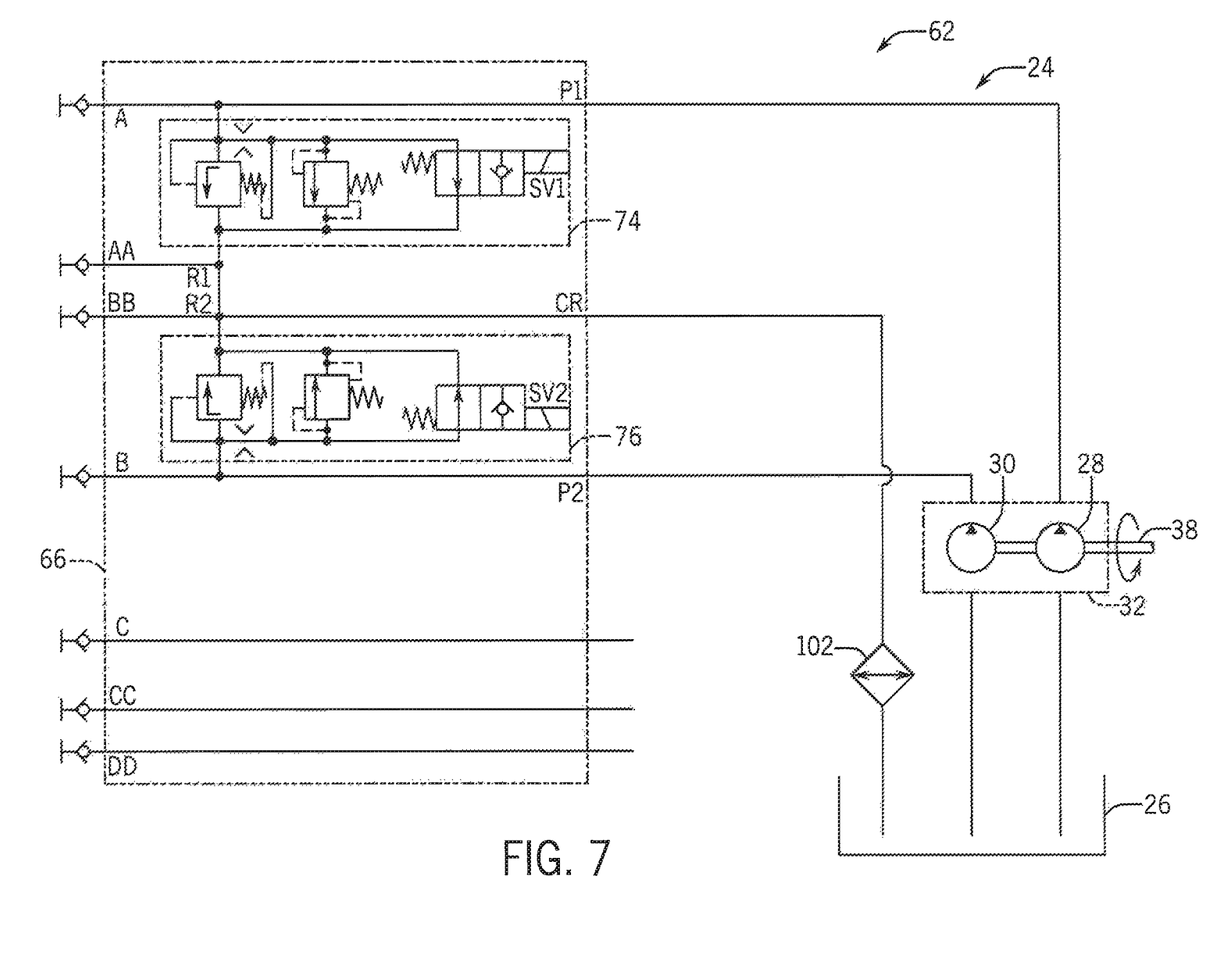
FIG. 7 is a schematic illustration of a hydraulic portion of quick-coupler manifold arrangement of a localized hydraulic circuit configuration detection and loading arrangement of the applicator of FIG. 1.

The exemplary embodiment of the applicator 10 also includes a hydraulic circuit 24, a relevant portion of which is shown in FIG. 7.

Figure 8:
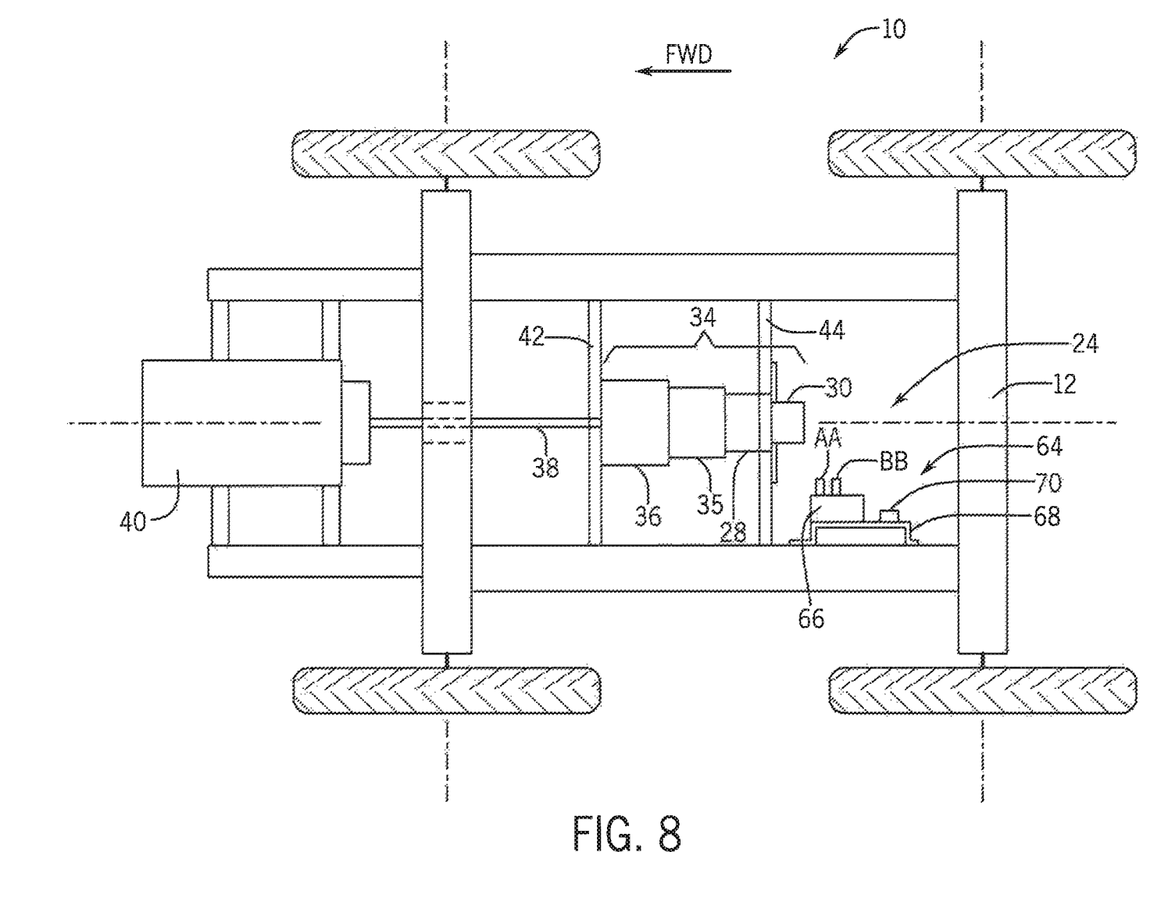
FIG. 8 is an orthographic illustration of elements of a hydraulic circuit of the applicator of FIG. 1, and the quick-coupler manifold arrangement of the localized hydraulic circuit configuration detection and loading arrangement of the applicator of FIGS. 1 and 7.

As shown in FIGS. 7 and 8, the applicator hydraulic circuit 24 includes a hydraulic fluid reservoir 26 first and second continuously running hydraulic pumps 28,30 that are commonly packaged as a dual pump 32 arrangement. The dual pump arrangement 32 is part of a pump stack 34 that is attached to the frame 12 for delivering respective first and second flows of pressurized hydraulic fluid at an operating pressure from the reservoir 26 to one or more of the product delivery units 16,18,20,22,17 mounted on the bed 14 of the applicator 10. In the exemplary embodiment of the applicator 10, the first pump 28 has a larger displacement than the second pump 30 such that the at rated speed the first pump continuously delivers a flow of approximately 28 gallons per minute of hydraulic fluid at a nominal operating pressure of 3100 PSI, and the smaller second pump 30 delivers a flow of approximately 11 gallons per minute of hydraulic fluid at a nominal operating pressure of 1600 PSI.

As further illustrated in FIG. 8, the pump stack 34 also includes third and fourth continuously running pumps 35,36 that provide hydraulic fluid for propulsion, or other operations of the applicator 10. The pumps 28,30,35,36 are all operatively and physically connected together to be driven by a common driveshaft 38 connecting the pump stack 34 to the engine 40 of the applicator 10. The pump stack 34 is mounted to the frame 12 of the applicator 10 by a pair of crossmembers 42,44.

As illustrated schematically by phantom lines in FIG. 9, the applicator 10 and each of the product delivery units 16,18,20,22,17 also have respective electrical circuits 50,52, 54,56,58,60 adapted for connection in electrical communication with one another, in a manner described in further detail below.

Figure 9:
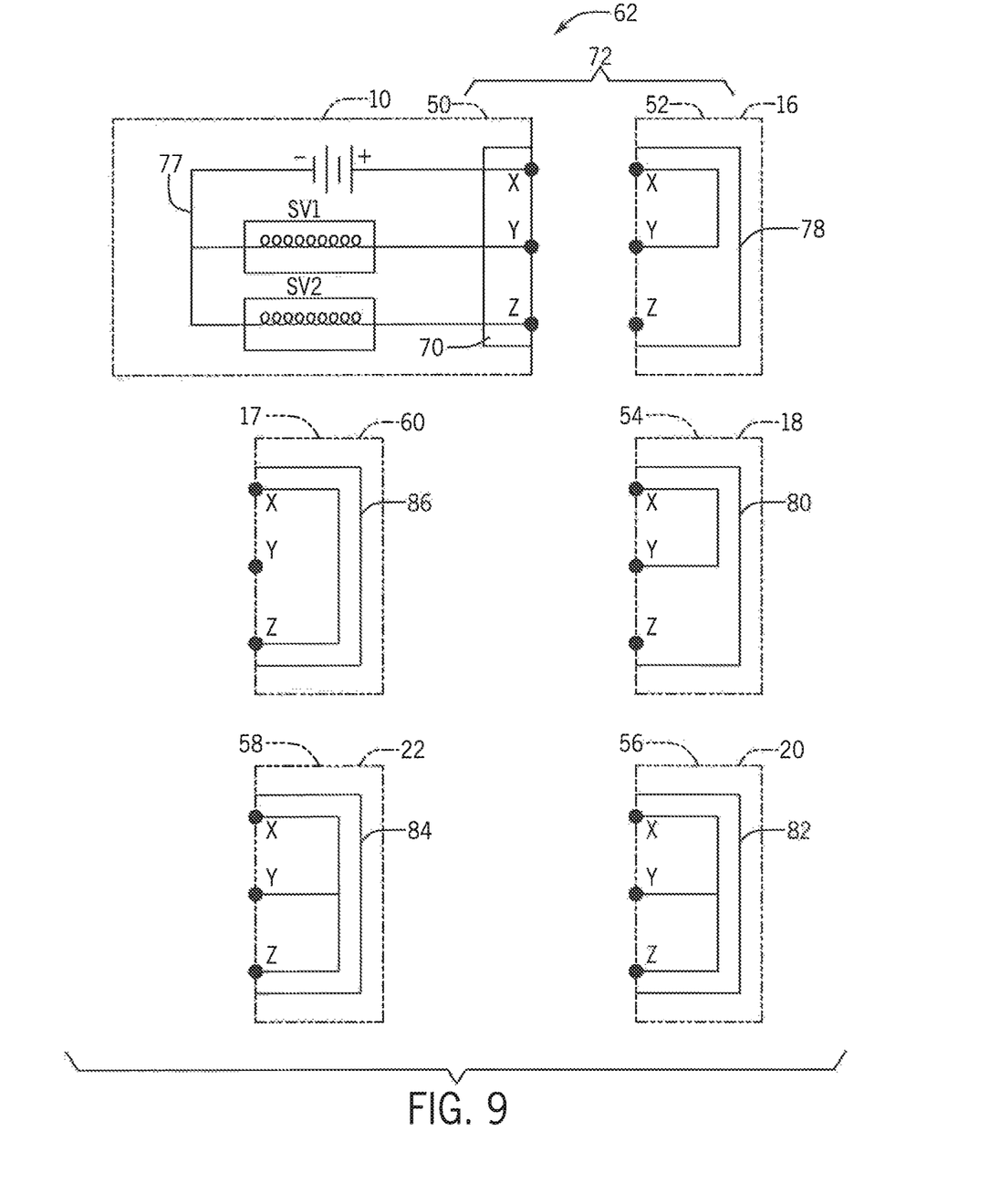
FIG. 9 is a schematic representation of an electrical interface arrangement of the quick-coupler manifold arrangement of the localized hydraulic circuit configuration detection and loading arrangement of the applicator of FIGS. 1 and 7-8.

The exemplary embodiment of the applicator 10 also includes a localized hydraulic circuit configuration detection and loading arrangement 62, that is generally illustrated schematically by the combination of the elements illustrated in the hydraulic circuit of FIG. 7 with the electrical circuit elements 50,52,54,56,58,60 of FIG. 9.

Figure 10:
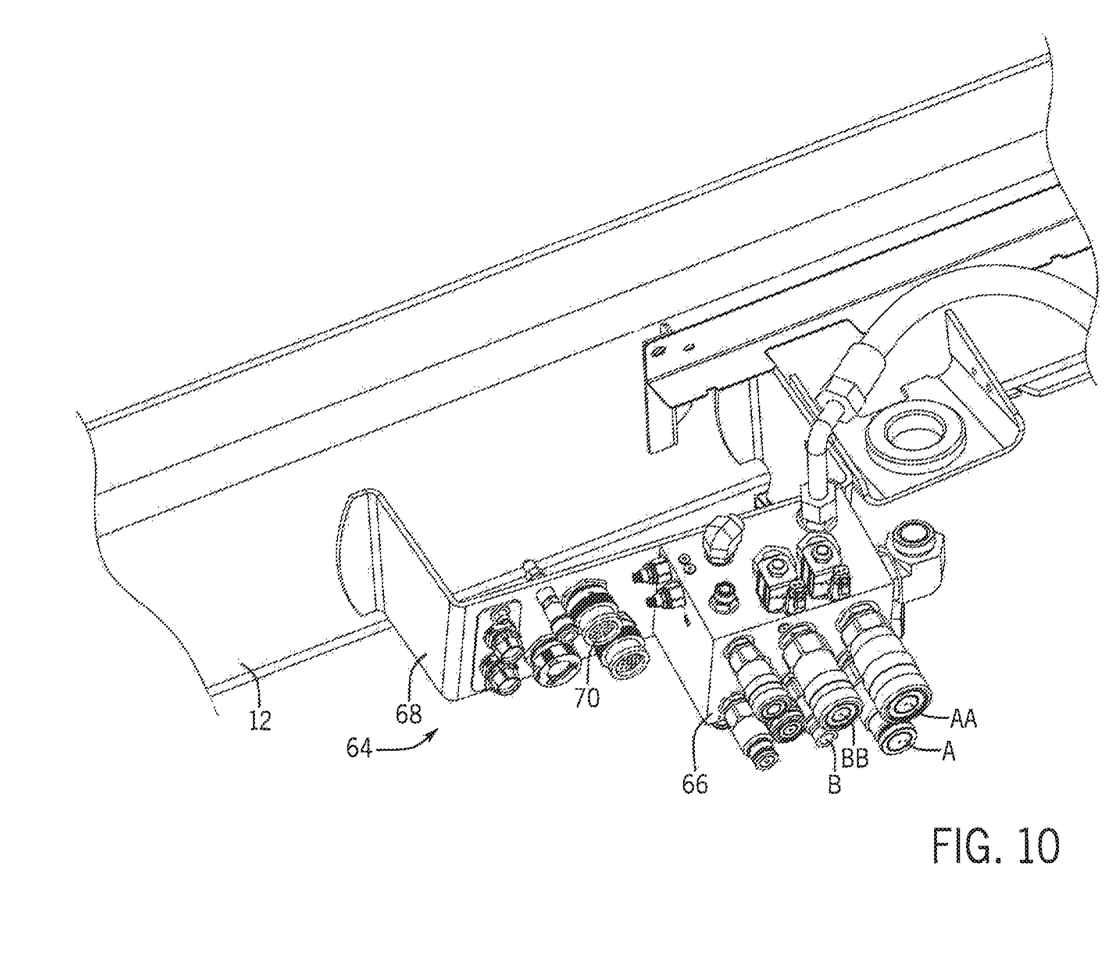
FIG. 10 is an isometric view of the quick-coupler manifold arrangement of the localized hydraulic circuit configuration detection and loading arrangement of the applicator of FIGS. 1 and 7-9.

As shown in FIGS. 7, 8 and 10, the localized hydraulic circuit configuration detection and loading arrangement 62 of the applicator 10 includes a quick-coupler manifold arrangement 64 having a valve block 66 that is adapted for fixed attachment, via a mounting bracket 68 of the quick-coupler manifold arrangement 64 to the frame 12 of the applicator 10 adjacent the bed 14 of the applicator 10. The quick-coupler manifold arrangement 64 includes a first pair of hydraulic quick-connectors A,AA, that are associated with directing flow from the first pump 28, and a second pair of hydraulic quick-connectors B,BB, that are associated with directing flow from the second pump 30 in a manner described in more detail below.

As also shown in FIGS. 8-10, the quick-coupler manifold arrangement 64 of the exemplary embodiment of the localized hydraulic circuit configuration detection and loading arrangement 62 of the applicator 10 also includes an electrical connector 70 of an electrical interface arrangement 72 for connecting the electrical circuit 52,54,56,58,60 of one of the product delivery units 16,18,20,22,17 mounted on the bed 14 of the applicator 10 in electrical communication with the electrical circuit 50 of the applicator 10, in a manner described in further detail below.

From an examination of FIG. 10, those having skill in the art will note that the exemplary embodiment of the valve block 66 also includes a number of other hydraulic interface connections associated with hydraulic interfaces related to the product delivery units 16,18,20,22 that are not specifically a part of the localized hydraulic circuit configuration detection and loading arrangement 62 of the exemplary embodiment of the applicator 10. These other hydraulic connections are associated with other pumps of the applicator, or constant pressure functions such as manipulating the booms on the sprayer 16.

As further shown in FIG. 10 the exemplary embodiment of the valve block 66 also includes several additional electrical connectors, besides the applicator electrical interface connector 70 of the exemplary embodiment of the electrical interface arrangement 72 for connecting the electrical circuit 52,54,56,58,60 of one of the product delivery units 16,18,20,22,17 mounted on the bed 14 of the applicator 10 in electrical communication with the electrical circuit 50 of the applicator 10. These additional connectors are also associated with the electrical circuits of a particular one of the product delivery units 16,18,20,22,17 mounted on the bed 14 of the applicator 10, and are configured to provide such functions as: battery power for, and electrical grounding of the product delivery unit; electrical power for lighting of the product delivery unit; and electrical control of boom functions, such as folding and raising and lowering of the boom, on a liquid product delivery unit.

In the exemplary embodiment of the applicator 10, all hydraulic and electrical connections are located at the quick-coupler manifold arrangement 64 of the exemplary embodiment of the localized hydraulic circuit configuration detection and loading arrangement 62. All of the connectors used in the hydraulic and electrical interfaces made at the quick-coupler manifold arrangement 64 are also keyed in such a manner that they cannot be misconnected. Those having skill in the art will appreciate that by virtue of having all of the hydraulic and electrical interfaces between any of the product delivery units 16,18,20,22,17 and the applicator 10 localized and keyed in this manner, installation and changeover time is significantly reduced. The risk of misconnection is essentially eliminated, and the need for personnel performing the installation or changeover to have a high degree of technical expertise is substantially reduced.

As shown in FIG. 7, the valve block 66 in the exemplary embodiment of the applicator 10 includes two solenoid operated pump control valve arrangements 74,76 that are respectively configured and operatively connected for selectively directing a flow of hydraulic fluid at the respective operating pressures from one or both of the first and second continuously operating pumps 28,30 of the applicator 10 to one of the product delivery units 16,18,20,22,17 mounted on the bed 14 of the applicator 10. The first and second solenoid operated pump control valve arrangements 74,76 are also respectively configured and connected for selectively bypassing the flow of fluid from one or both of the first and second pumps 28,30 back to the hydraulic reservoir 26 of the applicator at the low, bypass pressure.

As shown in FIGS. 7 and 9, each of the first and second solenoid operated pump control arrangements 74,76 in the valve block 66 also includes a respective solenoid SV1,SV2 that is connected to battery power by a solenoid activation circuit 77 of the applicator electrical circuit 50. The respective electrical solenoids SV1,SV2 are both connected to battery power within the solenoid activation circuit 77, in an open circuit relationship, to pins X, Y, Z of the applicator electrical connector 70 of the electrical interface arrangement 72 mounted on the bracket 68 of the quick-coupler manifold arrangement 64, alongside the valve body 66.

As further shown in FIG. 9, the electrical interface arrangement 72 of the exemplary embodiment of the applicator 10 also includes separate electrical interface connectors 78,80,82,84,86 for each of the product delivery units 16,18,20,22,17 that have a mating pins X, Y, Z interconnected in a pattern that is unique to a particular one of the hydraulically powered product delivery units 16,18,20,22,17 that may be mounted on the self-propelled agricultural product applicator 10. Each of the electrical interface connectors 78,80,82,84,86, for the several product delivery units 16,18,20,22,17 configured for mounting on the applicator 10, is configured to mate with the applicator electrical interface connector 70.

The unique pattern of pins in each of the electrical interface connectors 78,80,82,84,86 for the several product delivery units 16,18,20,22,17 is configured and interconnected to close one or both of the dedicated solenoid activation circuits SV1,SV2 in the solenoid operated pump control valve arrangements 74,76 for selectively connecting a flow of hydraulic fluid at an operating pressure from one or both of the continuously operating pumps 28,30 of the applicator 10 to the particular one of the product delivery units 16,18,20,22,17 that is mounted on the bed 14 of the applicator 10, in a manner unique to that particular product delivery unit.

As shown in FIG. 7, the valve block 66 includes individual first and second inlet passages P1,P2 configured for respectively receiving a flow of pressurized fluid from the first and second continuously running pumps 28,30. The first and second individual inlet passages P1,P2 are respectively connected in fluid communication with corresponding first and second individual outlet hydraulic interface quick-couplers A,B that are adapted for connection in fluid communication with one or more of the several product delivery units 16,18,20,22,17 adapted for mounting on the bed 14. The valve block 66 also defines an individual first and second return passage R1,R2 for each of the first and second pumps 28,30 that is connected in fluid communication via a common return line CR with the reservoir 26. The first and second individual return passages R1,R2 are also respectively connected in fluid communication with corresponding individual inlet hydraulic interface quick-couplers AA,BB that are adapted for connection in fluid communication with one or more of the several product delivery units 16,18,20, 22,17 configured for mounting on the bed 14.

As further shown in FIG. 7, the first solenoid operated pump control valve arrangement 74 is connected in fluid communication between the first individual inlet passage P1 and the return line R1 for the first pump 28. In similar fashion, the second solenoid operated pump control valve arrangement 76 is connected in fluid communication between the second individual inlet passage P2 and the return line R2 for the second pump 30.

In the exemplary embodiment of the localized hydraulic circuit configuration detection and loading arrangement 62, the first and second solenoid operated pump control valve arrangements 74,76 are identically internally constructed, although they are shown as mirror images of one another in the schematic illustration of FIG. 7. Accordingly, for the sake of brevity, only the internal construction of the first solenoid operated pump control valve arrangement 74 will be described in detail below, with reference to FIG. 11.

Figure 11:
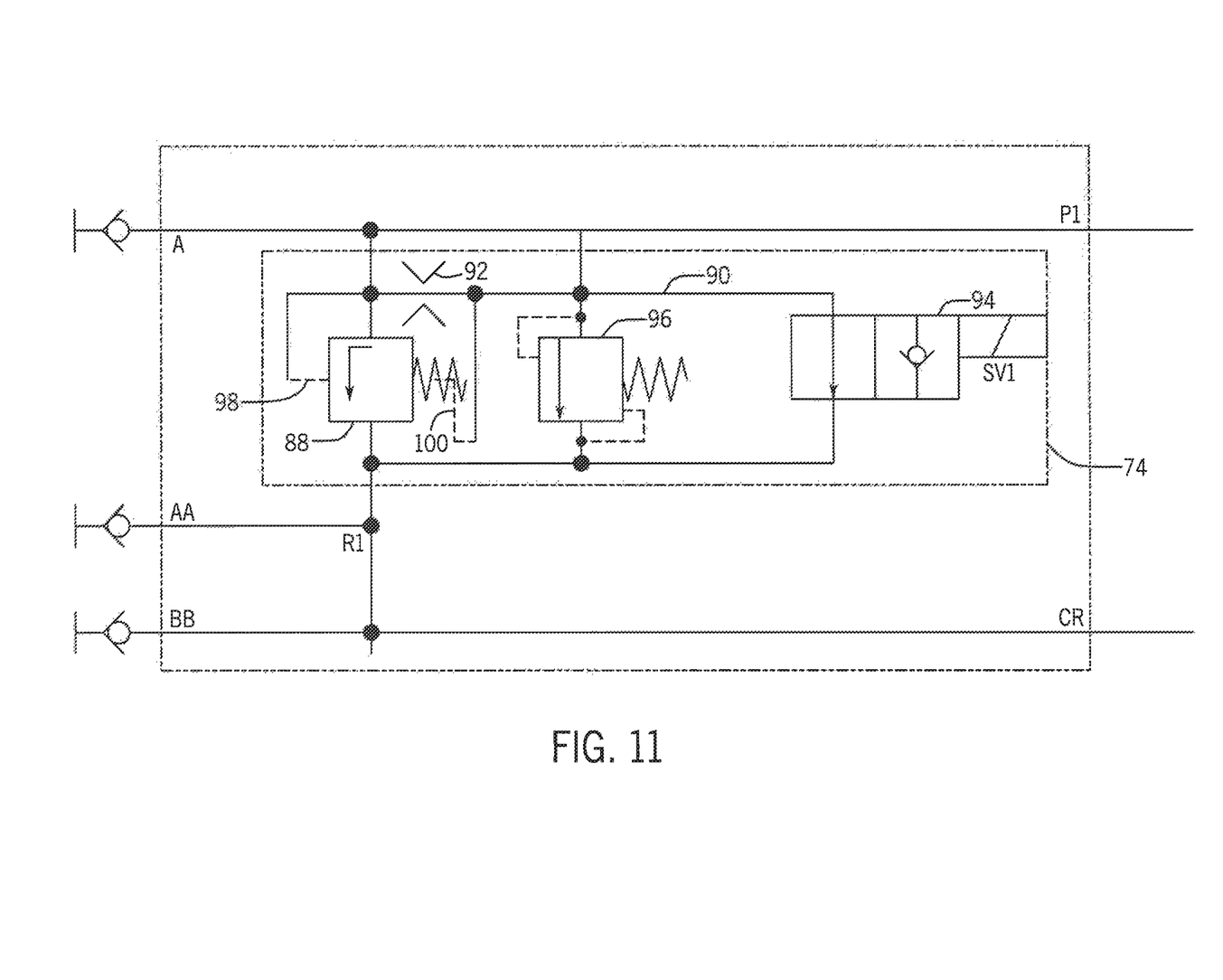
FIG. 11 is an enlarged schematic view of a solenoid operated pump control valve arrangement of the hydraulic portion of quick-coupler manifold arrangement of a localized hydraulic circuit configuration detection and loading arrangement of the applicator illustrated in FIG. 8.

As shown in FIG. 11, the first solenoid operated bypass valve arrangement 74, in the exemplary localized hydraulic circuit configuration detection and loading arrangement 62 includes a normally-closed, high-flow, low differential pressure relief valve 88, a control loop 90 having a flow restricting orifice 92, a two-way, normally-open, solenoid operated shut off valve 94, and a high-pressure relief valve 96.

The normally-closed, high-flow, low differential pressure relief valve 88 is connected in fluid communication between the first pump inlet passage P1 and the first return line R1 for the first pump 28. The control loop 90, with its flow restricting orifice 92, is connected across the normally-closed, low differential pressure relief valve 88 in a parallel circuit arrangement. The two-way, normally-open, solenoid operated shut off valve 94 is connected in a series relationship within the control loop 90, at a location between the flow restricting orifice 92 and the return line R1 for the first pump 28, for controlling flow through the control loop 90.

The normally-closed, high-flow, low differential pressure relief valve 88 also has a high-pressure control port 98 connected in fluid communication with the first pump inlet passage P1, and a low-pressure control port 100 connected in fluid communication with the control loop 90 at a point between the flow restricting orifice 92 and the two-way, normally-open, solenoid operated shut off valve 94.

The solenoid SV1 of the first two-way, normally-open, solenoid operated shut off valve 94 is configured and connected to the applicator electrical interface connector 70 in such a manner that when the solenoid SV1 is not energized, the shut off valve 94 allows a control flow through the control loop 90 that generates a pressure drop through the flow restricting orifice 92 and across the normally-closed, high-flow, low differential pressure relief valve 88 that is sufficient to cause the normally-closed, high-flow, low differential pressure relief valve 88 to open and bypass flow from the first inlet passage P1 to the return line R1. The normally-closed, high-flow, low differential pressure relief valve 88 is configured such that it has a minimal internal pressure drop at high flow rates, resulting in the bypass flow passing through the normally-closed, high-flow, low differential pressure relief valve 88 at the low, bypass pressure.

The solenoid SV1 of the first two-way, normally-open, solenoid operated shut off valve 94 is further configured and connected to the applicator electrical interface connector 70 in such a manner that when the solenoid SV1 is energized, the normally-open shut off valve 94 is actuated to block the control flow through the control loop 90. With no flow through the control loop 90, there is no resultant pressure drop generated through the flow restricting orifice 92, thereby causing the normally-closed, high-flow, low differential pressure relief valve 88 to close and block bypass flow from the first inlet passage P1 to the first return line R1, in such a manner that the inlet passage P1 for the first pump 28 delivers flow at the full operating pressure of the first pump 28, via quick-coupler A to the product delivery unit mounted on the bed 14.

As further shown in FIG. 11, in the first solenoid operated bypass valve arrangement 74, according to the invention, the high pressure relief valve 96 is connected in parallel with the two-way, normally-open, solenoid operated shut off valve 94 at a point in the control loop 90 downstream from the flow restricting orifice 92, in such a manner that when the high pressure relief valve 96 opens, flow through the high pressure relief valve 96 allows a control flow through the control loop 90, thereby generating a pressure drop through the flow restricting orifice 92 that is sufficient to cause the normally-closed, high-flow, low differential pressure relief valve 88 to open and bypass flow from the first inlet passage P1 at the predetermined operating pressure to the first return line R1.

As previously stated, construction and operation of the second solenoid operated bypass valve arrangement 76 for selectively loading or bypassing flow from the second pump 30 is essentially identical to the construction and operation described above with reference to FIG. 11 for selectively loading or bypassing flow from the first pump 30 using the first solenoid operated bypass valve arrangement 76.

By virtue of the above described construction of the exemplary embodiment, it will be understood that, by selectively energizing one or the other, or both of the solenoids SV1,SV2 of the first and second solenoid operated bypass valve arrangements 74,76, flow from the first and second pumps may be selectively connected to, or bypass a particular one of the product delivery units 16,18,20,22,17 mounted on the bed of the applicator 10, and connected to one or both pairs of the quick-couplers A, AA, B, BB of the valve block 66. It will be further appreciated that when neither of the solenoids SV1,SV2 is actuated, the flow of hydraulic fluid from the first and second pumps 28,30 is completely bypassed back to the reservoir 26.

As shown in FIGS. 2-6, a particular product delivery unit may utilize flow from one or both of the first and second pumps 28,30. For example, in the exemplary embodiments of the product delivery units 16,18,20,22,17 shown in FIGS. 2-6, the sprayer 16 of FIG. 2, and the single-bin dry box 18 of FIG. 3 both have only one pair of mating hydraulic quick-couplers A,AA to utilize flow from only the first pump 28. The two-bin dry box 20 of FIG. 4, and the four-bin dry box 22 of FIG. 5 both have need of more hydraulic power than is available from the first pump 28 alone, and consequently are configured to have two pairs of mating hydraulic quick-couplers A, AA, B, BB to receive flow from both the first pump 28 and the second pump 30. The low-volume sprayer 17 of FIG. 6 utilizes only the smaller second pump 30, and thus has only one pair of mating hydraulic quick-couplers B,BB for operating with flow from only the second pump 30.

As shown in FIG. 7, flow bypassing the hydraulic quick-couplers A, AA, B, BB is returned to the reservoir 26 via the common return line CR through an oil cooler arrangement 102. By virtue of the construction of the first and second solenoid operated bypass valve arrangements 74,76, heating of the hydraulic fluid is minimized by bypassing the flow at a relatively low bypass pressure of about 60 PSI, even with the first and second pumps 28,30 running continuously. In addition, the bypass flow generated by either the first or second pump 28,30 is drawn from the common reservoir 26, and then returned to the same common reservoir 26 through the oil cooler 102, thereby providing an advantage in that the bypassed pump acts a circulating pump to facilitate cooling of the hydraulic fluid.

The manner in which the exemplary embodiment of the localized hydraulic circuit configuration detection and loading arrangement 62 is utilized to detect which of the product delivery units 16,18,20,22,17 is mounted on the bed 14 of the applicator 10 and selectively configure the first and second solenoid operated bypass valve arrangements 74,76 accordingly for delivering flow to the detected product delivery unit from one or both of the first and second pumps 28,30, is illustrated in FIG. 9.

As shown in FIG. 9, when the sprayer 16 is mounted on the bed 14 with its interface connector 78 connected to the applicator electrical interface connector 70, pin pairs XX and YY are mated in a manner that completes the normally open electrical circuit through the solenoid SV1 of the first solenoid operated bypass valve arrangement 74, and causes the first solenoid operated bypass valve arrangement 74 to direct flow from the first pump 28 through the quick-couplers A,AA of the sprayer 16. Because pin Z is not connected to pin X in the electrical interface connector 78 of the sprayer, the normally open circuit through the second solenoid SV2 of the second solenoid operated bypass valve arrangement 76 remains open, and the second solenoid operated bypass valve arrangement 76 continues to bypass flow from the second pump 30 back to the reservoir 26 through the oil cooler 102. The same hydraulic flow configuration is established by the localized hydraulic circuit configuration detection and loading arrangement 62 when it detects that the connector 80 of the single-bin dry box 18 has been mated with the applicator electrical interface connector 70, thereby indicating that it is the single-bin dry box that is presently mounted on the bed 14 of the applicator 10.

As further shown in FIG. 7, when either the two-bin dry box 20 or the four-bin dry box 22 is mounted on the bed 14 with its respective interface connector 82,84 connected to the applicator electrical interface connector 70, all three pin pairs XX and YY and ZZ are mated in a manner that completes the open electrical circuits through both the solenoid SV1 of the first solenoid operated bypass valve arrangement 74 and the solenoid SV2 of the second solenoid operated bypass valve arrangement 76. This causes the first solenoid operated bypass valve arrangement 74 to direct flow from the first pump 28 through the quick-couplers A,AA, and also causes the second solenoid operated bypass valve arrangement 76 to direct flow from the second pump 30 through the quick-couplers B,BB to whichever one of the two-bin or four-bin dry boxes 20,22 is mounted on the bed 14 of the applicator 10.

Those having skill in the art will appreciate that by using the unique pin patterns in the electrical interface connectors 78,80,82,84,86 of the product delivery units 16,17,18,20,22 can locally detect, at the quick-coupler manifold arrangement 62, whether or not one of the product delivery units 16,18,20,22,17 is currently mounted on the bed 14 of the applicator 10, and if a mounted product delivery unit is detected, which one of the product delivery units 16,18,20, 22,17 is currently mounted on the bed 14. By allowing localized detection at the quick-coupler manifold arrangement 62, and localized configuring of the hydraulic flow within the valve body 66 of the quick-coupler manifold arrangement 62 in the rugged and elegantly straightforward manner described above for the exemplary embodiments, the need to provide more sophisticated and expensive dedicated control means, or for consuming capacity of onboard electronic control units of the applicator 10 is eliminated.

Those having skill in the art will also understand that, although the exemplary embodiments described herein addressed a localized hydraulic circuit configuration detection and loading arrangement for product delivery units receiving a flow of hydraulic fluid from one or both of two continuously running pumps, the invention may also be practiced with efficacy in other embodiments having more than two pumps.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A localized hydraulic circuit configuration detection and loading arrangement for a self-propelled agricultural product applicator having a frame defining a bed for receiving a hydraulically powered product delivery unit, with the applicator having a hydraulic circuit including a reservoir and one or more continuously running hydraulic pumps operatively attached to the frame for delivering a flow of pressurized hydraulic fluid at an operating pressure from the reservoir to a product delivery unit mounted on the bed of the applicator, the applicator and product delivery units each also having respective electrical circuits adapted for connection in electrical communication with one another, the localized hydraulic circuit configuration detection and loading arrangement comprising:

a quick-coupler manifold arrangement having a valve block adapted for fixed attachment to the frame of the applicator adjacent the bed, and an electrical interface arrangement for connecting the electrical circuit of a product delivery unit mounted on the bed in electrical communication with the electrical circuit of the applicator;

the valve block including one or more solenoid operated pump control valve arrangements configured and operatively connected for selectively directing a flow of hydraulic fluid at an operating pressure from one or more of the continuously operating pumps of the applicator to the product delivery unit, and for selectively bypassing the flow of fluid from one or more of the pumps back to the hydraulic reservoir of the applicator at a low, bypass pressure, with the solenoid operated pump control valve arrangements each including a dedicated solenoid activation circuit connected in an open circuit relationship to pins of an applicator electrical connector of the electrical interface arrangement that is mounted on the valve body;

the electrical interface arrangement further including an electrical interface connector of the product delivery unit that has a pattern of pins unique to a particular hydraulically powered product delivery unit mounted on the self-propelled agricultural product applicator, with the unique pattern of pins being configured and interconnected to close one or more of the dedicated solenoid activation circuits in the solenoid operated pump control valve arrangements for selectively connecting a flow of hydraulic fluid at an operating pressure from one or more of the continuously operating pumps of the applicator to the product delivery unit, in a manner unique to the particular product delivery unit mounted on the bed of the applicator.

2. The localized hydraulic circuit configuration detection and loading arrangement of claim 1, wherein the solenoid operated pump control valve arrangements are configured and connected in such a manner that the flow of fluid from all of the pumps is bypassed back to the hydraulic reservoir of the applicator at the low, bypass pressure when no product delivery unit is mounted on the bed of the applicator.

3. The localized hydraulic circuit configuration detection and loading arrangement of claim 1, wherein the solenoid operated pump control valve arrangements are configured and connected in such a manner that the flow of fluid from all of the pumps is bypassed back to the hydraulic reservoir of the applicator at the low, bypass pressure when a product delivery unit is mounted on the bed of the applicator but the electrical interface connector of the product delivery unit is not connected to the applicator.

4. The localized hydraulic circuit configuration detection and loading arrangement of claim 1, wherein the unique pattern of pins in the electrical interface connector of the product delivery unit is further configured and interconnected to leave open one or more of the dedicated solenoid activation circuits in the solenoid operated pump control valve arrangements for selectively bypassing the flow of fluid from one or more of the pumps back to the hydraulic reservoir of the applicator at the low, bypass pressure in a manner unique to the particular product delivery unit mounted on the bed of the applicator.

5. The localized hydraulic circuit configuration detection and loading arrangement of claim 4, wherein the applicator includes at least two continuously running pumps and the bed of the applicator is configured to receive at least a first and a second product delivery unit, with the first product delivery unit being configured to receive flow at operating pressure from only one of the at least two continuously running pumps, wherein the remaining pumps bypassing oil to the hydraulic reservoir at the low, bypass pressure and the second product delivery unit being configured to receive flow at operating pressure from more than one of the at least two continuously running pumps; wherein any remaining pumps bypassing oil to the hydraulic reservoir at the low, bypass pressure.

6. The localized hydraulic circuit configuration detection and loading arrangement of claim 5, wherein the bed of the applicator is configured to receive at least one additional product delivery unit configured for receiving flow from an additional unique combination of the operating pressure or the bypass pressure configurations for the at least two continuously running pumps that is different from the unique combinations of the operating pressure or the bypass pressure configurations for the at least two continuously running pumps supplying flow to the first and second product delivery units.

7. The localized hydraulic circuit configuration detection and loading arrangement of claim 1, wherein:
the valve block includes an individual inlet passage configured for receiving a flow of pressurized fluid from each pump, with each individual inlet passage being connected in fluid communication with an individual outlet hydraulic interface connection for that pump that is adapted for connection in fluid communication with a product delivery unit mounted on the bed;
the valve block also defines a return passage for each pump adapted for connection in fluid communication with the reservoir;
the valve block further includes a solenoid operated pump control valve arrangement connected in fluid communication between the individual inlet passage and the return line for that pump, with the solenoid operated pump control valve arrangement for each pump having a solenoid operated bypass valve arrangement for that pump connected in fluid communication between the individual inlet passage and the return line for that pump;
the solenoid operated bypass valve arrangement is configured in such a manner that when the solenoid of the solenoid operated bypass valve arrangement for a particular pump is not energized, the flow from that particular pump passes through that bypass valve arrangement from the inlet to the return line for that particular pump at the low, bypass pressure across the solenoid operated bypass valve; and
the solenoid operated bypass valve is further configured in such a manner that when the solenoid of the solenoid operated bypass valve arrangement for a particular pump is energized, bypass flow through the solenoid operated bypass valve arrangement for that particular pump is blocked so that flow from that particular pump is directed to the product delivery unit through the pump inlet passage for that particular pump at the operating pressure of that pump, up to a predetermined maximum operating pressure.

8. The localized hydraulic circuit configuration detection and loading arrangement of claim 7, wherein at least one of the solenoid operated bypass valve arrangements includes:
a normally-closed, high-flow, low differential pressure relief valve connected in fluid communication between the pump inlet passage and the return line for one of the pumps;
a control loop having a flow restricting orifice connected across the normally-closed, low differential pressure relief valve in a parallel circuit arrangement; and
a two-way, normally-open, solenoid operated shut off valve connected in a series relationship in the control loop between the flow restricting orifice and the return line for the one of the pumps, for controlling flow through the control loop;
the normally-closed, high-flow, low differential pressure relief valve also having a high-pressure control port connected in fluid communication with the pump inlet passage and a low-pressure control port connected in fluid communication with the control loop between the flow restricting orifice and the two-way, normally-open, solenoid operated shut off valve;
the solenoid of the two-way, normally-open, solenoid operated shut off valve being configured and connected to the applicator electrical interface connector in such a manner that when the solenoid is not energized the shutoff valve allows a control flow through the control loop generating a pressure drop through the flow restricting orifice sufficient to cause the normally-closed, high-flow, low differential pressure relief valve to open and bypass flow from the inlet passage of the one of the pumps to the return line for that one of the pumps at the low, bypass pressure;
the solenoid of the two-way, normally-open, solenoid operated shut off valve being further configured and connected to the applicator electrical interface connector in such a manner that when the solenoid is energized the normally-open shut off valve blocks the control flow through the control loop, thereby resulting in no pressure drop being generated through the flow restricting orifice and causing the normally-closed, high-flow, low differential pressure relief valve to close and block bypass flow from the inlet passage of the one of the pumps to the return line for that one of the pumps, in such a manner that the inlet passage for that one of the pumps delivers flow at the operating pressure of that one of the pumps to the product delivery unit.

9. The localized hydraulic circuit configuration detection and loading arrangement of claim 8, wherein the at least one of the solenoid operated bypass valve arrangements further includes a high pressure relief valve connected in parallel with the two-way, normally-open, solenoid operated shut off valve downstream from the flow restricting orifice, and configured to open at a predetermined maximum operating pressure above the operating pressure, whereby when the high pressure relief valve opens, flow through the high pressure relief valve allows a control flow through the control loop generating a pressure drop through the flow restricting orifice sufficient to cause the normally-closed, high-flow, low differential pressure relief valve to open and bypass flow at the predetermined maximum operating pressure in parallel with the high pressure relief valve from the inlet passage of the one of the pumps to the return line for that one of the pumps.

10. A self-propelled agricultural product applicator having a frame defining a bed for receiving a hydraulically powered product delivery unit, with the applicator having a hydraulic circuit including a reservoir and one or more continuously running hydraulic pumps operatively attached to the frame for delivering a flow of pressurized hydraulic fluid at an operating pressure from the reservoir to a product delivery unit mounted on the bed of the applicator, the applicator and product delivery units each also having respective electrical circuits adapted for connection in electrical communication with one another, wherein the applicator includes a localized hydraulic circuit configuration detection and loading arrangement comprising:
- a quick-coupler manifold arrangement having a valve block adapted for fixed attachment to the frame of the applicator adjacent the bed, and an electrical interface arrangement for connecting the electrical circuit of a product delivery unit mounted on the bed in electrical communication with the electrical circuit of the applicator;
- the valve block including one or more solenoid operated pump control valve arrangements configured and operatively connected for selectively directing a flow of hydraulic fluid at an operating pressure from one or more of the continuously operating pumps of the applicator to the product delivery unit, and for selectively bypassing the flow of fluid from one or more of the pumps back to the hydraulic reservoir of the applicator at a low, bypass pressure, with the solenoid operated pump control arrangements each including a dedicated solenoid activation circuit connected in an open circuit relationship to pins of an applicator electrical connector of the electrical interface arrangement that is mounted on the valve body;
- the electrical interface arrangement further including an electrical interface connector of the product delivery unit that has a pattern of pins unique to a particular hydraulically powered product delivery unit mounted on the self-propelled agricultural product applicator, with the unique pattern of pins being configured and interconnected to close one or more of the dedicated solenoid activation circuits in the solenoid operated pump control valve arrangements for selectively connecting a flow of hydraulic fluid at an operating pressure from one or more of the continuously operating pumps of the applicator to the product delivery unit in a manner unique to the particular product delivery unit mounted on the bed of the applicator.

11. The applicator of claim 10, wherein the unique pattern of pins in the electrical interface connector of the product delivery unit is further configured and interconnected to leave open one or more of the dedicated solenoid activation circuits in the solenoid operated pump control valve arrangements for selectively bypassing the flow of fluid from one or more of the pumps back to the hydraulic reservoir of the applicator at the low, bypass pressure in a manner unique to the particular product delivery unit mounted on the bed of the applicator.

12. The applicator of claim 11, wherein the solenoid operated pump control valve arrangements of the localized hydraulic circuit configuration detection and loading arrangement are configured and connected in such a manner that the flow of fluid from all of the pumps is bypassed back to the hydraulic reservoir of the applicator at the low, bypass pressure when no product delivery unit is mounted on the bed of the applicator.

13. The applicator of claim 11, wherein the applicator includes at least two continuously running pumps, and the bed of the applicator is configured to receive at least a first and a second product delivery unit, with the first product delivery unit being configured to receive flow from only one of the at least two continuously running pumps, and the second product delivery unit being configured to receive flow from more than one of the at least two continuously running pumps.

14. The applicator of claim 13, wherein the bed of the applicator is configured to receive at least one additional product delivery unit configured for receiving flow from an additional unique combination of the operating pressure or the bypass pressure configurations for the at least two continuously running pumps that is different from the unique combinations of the operating pressure or bypass pressure configurations for the at least two continuously running pumps supplying flow to the first and second product delivery units.

15. The applicator of claim 10, wherein:
- the valve block of the quick-coupler arrangement of the localized hydraulic circuit configuration detection and loading arrangement includes an individual inlet passage configured for receiving a flow of pressurized fluid from each pump, with each individual inlet passage being connected in fluid communication with an individual outlet hydraulic interface connection for that pump that is adapted for connection in fluid communication with a product delivery unit mounted on the bed;
- the valve block also defines a return passage for each pump adapted for connection in fluid communication with the reservoir;
- the valve block further includes a solenoid operated pump control valve arrangement connected in fluid communication between the individual inlet passage and the return line for that pump, with the solenoid operated pump control valve arrangement for each pump having a solenoid operated bypass valve arrangement for that pump connected in fluid communication between the individual inlet passage and the return line for that pump;
- the solenoid operated bypass valve arrangement is configured in such a manner that when the solenoid of the solenoid operated bypass valve arrangement for a particular pump is not energized, the flow from that particular pump passes through that bypass valve arrangement from the inlet to the return line for that particular pump at the low, bypass pressure across the solenoid operated bypass valve; and
- the solenoid operated bypass valve is further configured in such a manner that when the solenoid of the solenoid operated bypass valve arrangement for a particular pump is energized, bypass flow through the solenoid operated bypass valve arrangement for that particular pump is blocked so that flow from that particular pump is directed to the product delivery unit through the pump inlet passage for that particular pump at the operating pressure of that pump.

16. The applicator of claim 15, wherein at least one of the solenoid operated bypass valve arrangements of the localized hydraulic circuit configuration detection and loading arrangement includes:
- a normally-closed, high-flow, low differential pressure relief valve connected in fluid communication between the pump inlet passage and the return line for one of the pumps;
- a control loop having a flow restricting orifice connected across the normally-closed, low differential pressure relief valve in a parallel circuit arrangement; and a two-way, normally-open, solenoid operated shut off valve connected in a series relationship in the control loop between the flow restricting orifice and the return line for the one of the pumps, for controlling flow through the control loop;

the normally-closed, high-flow, low differential pressure relief valve also having a high-pressure control port connected in fluid communication with the pump inlet passage and a low-pressure control port connected in fluid communication with the control loop between the flow restricting orifice and the two-way, normally-open, solenoid operated shut off valve;

the solenoid of the two-way, normally-open, solenoid operated shut off valve being configured and connected to the applicator electrical interface connector in such a manner that when the solenoid is not energized the shutoff valve allows a control flow through the control loop generating a pressure drop through the flow restricting orifice sufficient to cause the normally-closed, high-flow, low differential pressure relief valve to open and bypass flow from the inlet passage of the one of the pumps to the return line for that one of the pumps at the low, bypass pressure;

the solenoid of the two-way, normally-open, solenoid operated shut off valve being further configured and connected to the applicator electrical interface connector in such a manner that when the solenoid is energized the normally-open shut off valve blocks the control flow through the control loop, thereby resulting in no pressure drop being generated through the flow restricting orifice and causing the normally-closed, high-flow, low differential pressure relief valve to close and block bypass flow from the inlet passage of the one of the pumps to the return line for that one of the pumps, in such a manner that the inlet passage for that one of the pumps delivers flow at the operating pressure of that one of the pumps to the product delivery unit.

17. The applicator of claim 16, wherein the at least one of the solenoid operated bypass valve arrangements of the localized hydraulic circuit configuration detection and loading arrangement further includes a high pressure relief valve connected in parallel with the two-way, normally-open, solenoid operated shut off valve downstream from the flow restricting orifice, whereby when the high pressure relief valve opens, flow through the high pressure relief valve allows a control flow through the control loop generating a pressure drop through the flow restricting orifice sufficient to cause the normally-closed, high-flow, low differential pressure relief valve to open and bypass flow at the predetermined maximum operating pressure from the inlet passage of the one of the pumps to the return line for that one of the pumps.

* * * * *